United States Patent [19]

Tremmel

[11] Patent Number: 5,022,136
[45] Date of Patent: Jun. 11, 1991

[54] METHOD AND A DEVICE FOR REMOVING AN ELONGATE SHRINK-FITTED CORE MADE OF A TOUGH MATERIAL FROM A HOLE

[75] Inventor: Dieter Tremmel, Nuremberg, Fed. Rep. of Germany

[73] Assignee: GEC Alsthom SA, Paris, France

[21] Appl. No.: 390,951

[22] Filed: Aug. 9, 1989

[30] Foreign Application Priority Data

Aug. 10, 1988 [DE] Fed. Rep. of Germany ....... 3827036

[51] Int. Cl.⁵ .............................................. B23P 19/02
[52] U.S. Cl. ................................... 29/426.4; 29/426.5; 29/889.1; 29/283.5
[58] Field of Search ............... 29/283.5, 402.03, 426.1, 29/426.2, 426.3, 426.4, 426.5, 426.6, 889, 889.1, 889.2, 889.21, 727; 416/220 R

[56] References Cited

U.S. PATENT DOCUMENTS

| | | | |
|---|---|---|---|
| 2,366,142 | 12/1944 | Allen | 29/426.4 |
| 4,321,012 | 3/1982 | Tan et al. | 416/217 |
| 4,400,137 | 8/1983 | Miller et al. | 29/889.1 X |
| 4,800,637 | 1/1989 | Overbay | 29/426.4 X |

FOREIGN PATENT DOCUMENTS

| | | |
|---|---|---|
| 0055415 | 3/1986 | European Pat. Off. ........ 416/220 R |
| 0347584 | 12/1989 | European Pat. Off. . |
| 1098960 | 2/1961 | Fed. Rep. of Germany . |
| 2951176 | 7/1980 | Fed. Rep. of Germany . |
| 3008889 | 12/1982 | Fed. Rep. of Germany . |
| 373167 | 5/1932 | United Kingdom . |
| 2043796 | 10/1980 | United Kingdom ............ 416/220 R |

Primary Examiner—Joseph M. Gorski
Assistant Examiner—S. Thomas Hughes
Attorney, Agent, or Firm—Sughrue, Mion, Zinn, Macpeak & Seas

[57] ABSTRACT

The invention relates to a method and a device for removing an elongate shrink-fitted core made of a tough material from a hole. According to the invention, a coupling member (5) or a pressure pin (3) is inserted into a bore (2) in the core (1) and projects therefrom. By applying a force to this member or pin, the core is elongated up to its plastic deformation range and is made to shrink radially. When the deformation has begun, the core is further loaded at low speed up to a maximum stress of between 95% and 97% of its rupture strength.

7 Claims, 6 Drawing Sheets

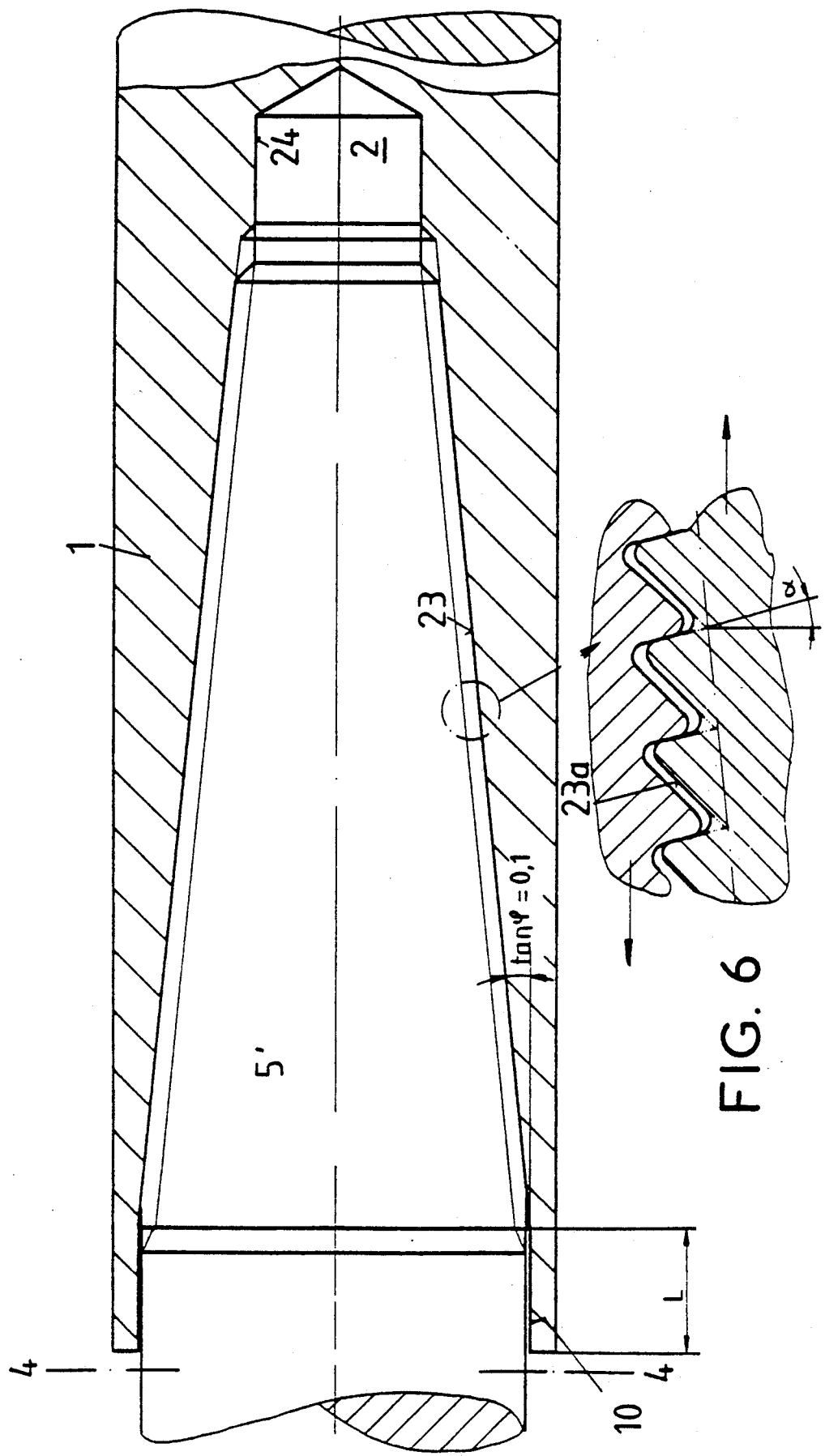

METHOD AND A DEVICE FOR REMOVING AN ELONGATE SHRINK-FITTED CORE MADE OF A TOUGH MATERIAL FROM A HOLE

In accordance with the preamble of claim 1, the invention relates to a method of removing elongate shrink-fitted shafts, bolts or similar cores made of tough material from hubs or holes. The invention further relates to devices for implementing the method according to the preamble of claims 4 and 7.

BACKGROUND OF THE INVENTION

In gas and steam turbines it is known to provide the rotor blades with plug-in fingers and to connect them to the head of the disk wheel via several rows of bolt and hole connections. In modern steam turbines, after a certain operation time, it happens that excessive radial friction forces prevent bolts or rivets (of up to 400 mm length in final stages and shorter bolts in high temperature stages) from being removed from the holes merely by applying pressure. This is due to the internal stresses between different levels inside the bolt, to contamination and oxidation of the mating surfaces and to elastic transverse expansion of the bolts when subjected to compression in combination with a jamming and latching effect due to disk or blade stems which are bent and slanting.

Since the known methods for removing jamming shrink fittings, such as subcooling or heating, and such as applying pressurized hydraulic oil with simultaneous pressing and drawing, assisted by a pneumatic hammer, are either technically inapplicable or else, if they can be applied, do not allow the desired result to be obtained, bolts have in the past been drilled out partially or totally down to a remaining wall thickness of about one tenth of a mm in order to release the internal stresses. However, there is a great risk that the rotary drill deviates and after penetration into the softer material of the hub is pushed progressively aside by the harder material of the bolt. As a result, holes have been observed in the stems of rotary blades and wheel disks having an ovality of 2 to 3 mm, which effect is detrimental for the connection function. In spite of the fact that the bolt drilling out might be rendered safer by the use of drilling sleeves and by operating with high precaution, this method cannot be applied in practice due to its relatively large time consumption and the resulting long turbine downtime.

It is therefore an object of the invention to provide a method of the kind indicated above and also devices for implementing this method allowing an easy and rapid removal of cores, especially shrink-fitted plug-in fingers.

SUMMARY OF THE INVENTION

This object is achieved, as far as the method is concerned, by a method of removing elongate shrink-fitted cores such as shafts or bolts from hubs or holes, wherein either a coupling member, which projects laterally from an axial bore in the core and which may be connected to a traction device, or else a solid bolt comprising an axiallY projecting end which may be loaded by a pressure device is inserted into said axial bore which, as the case may be, is previously cut into said core as coaxially as possible;
by drawing the core up to the plastic deformation range, the core is made to shrink radially, whereby after the deformation has begun, the core is loaded at a relatively low speed up to a maximum stress of between 95% and 97% of its rupture strength; and the core is extracted or ejected from the bore, if necessary after previously cutting off a terminal expanded area such as a rivet head or similar.

The application of the inventive method to the removal of blade bolts from steam turbines further entails the advantage that the additional nominal stress area required for the design of the blade connections can be totally or partially omitted. In order to achieve a "creep wave" which travels almost over the entire core length it is proposed in accordance with a further improvement of this method to draw the core from one side and to apply simultaneously a counterpressure on the opposing side. Another advantage of the method consists in the fact that ridges in the bore of the drilled elements can be totally or largely avoided which otherwise would appear due to the jamming and jam release phenomena.

According to a further improvement of the invention, the axial bore between the end of the thread and the end of the core comprises a smooth cylindrical portion, the inside diameter of which is equal to the outside diameter of the fine screw thread and the length of which is selected according to the formula $L \approx \sqrt{R \times S_R}$. Said cylindrical portion ensures the effect that the radial expansion rate at the screw end is relatively low.

The risk of a radial expansion can be further reduced or avoided by realizing the fine screw thread according to a further improvement of the invention as a sawtooth thread or similar thread of low radial expansion.

A further improvement of the device of the invention consists in the fact that each traction pin, each traction bolt and the associated core components are cone-shaped, that the threads are sawtooth threads or similar threads with low radial expansion and with bearing edge angles between 0° and 15° C., and that the conical bore in the core is followed by a smooth cylindrical portion, the diameter of which is equal to the largest outside diameter of the conical thread of the traction bolt and the length of which is selected according to the formula $L \approx \sqrt{R \times S_R}$. In this context, the conical shape of the pins or bolts results in an optimization of the useful cross-sections. The thread with a low radial expansion and the smooth cylindrical portions are required because of the low residual wall thickness of the core as, otherwise, the core may tear.

For reasons of ease of manufacture and optimum force transfer, each thread cone may include two portions with equal or unequal cone inclination, equal or unequal thread pitch and equal or unequal bearing edge angles.

BRIEF DESCRIPTION OF THE DRAWINGS

The drawings represent examples of the invention for the case of the removal of steam turbine blade finger bolts made conventionally from a material having 12% chromium.

FIG. 5 shows a detail of the third extraction device in connection with a conical thread.

FIG. 6 is a detail of FIG. 5 showing a conical sawtooth thread.

DETAILED DESCRIPTION

Some general considerations precede the description of the different method steps and the different devices for transferring the traction forces into the bolt.

Figure 1:
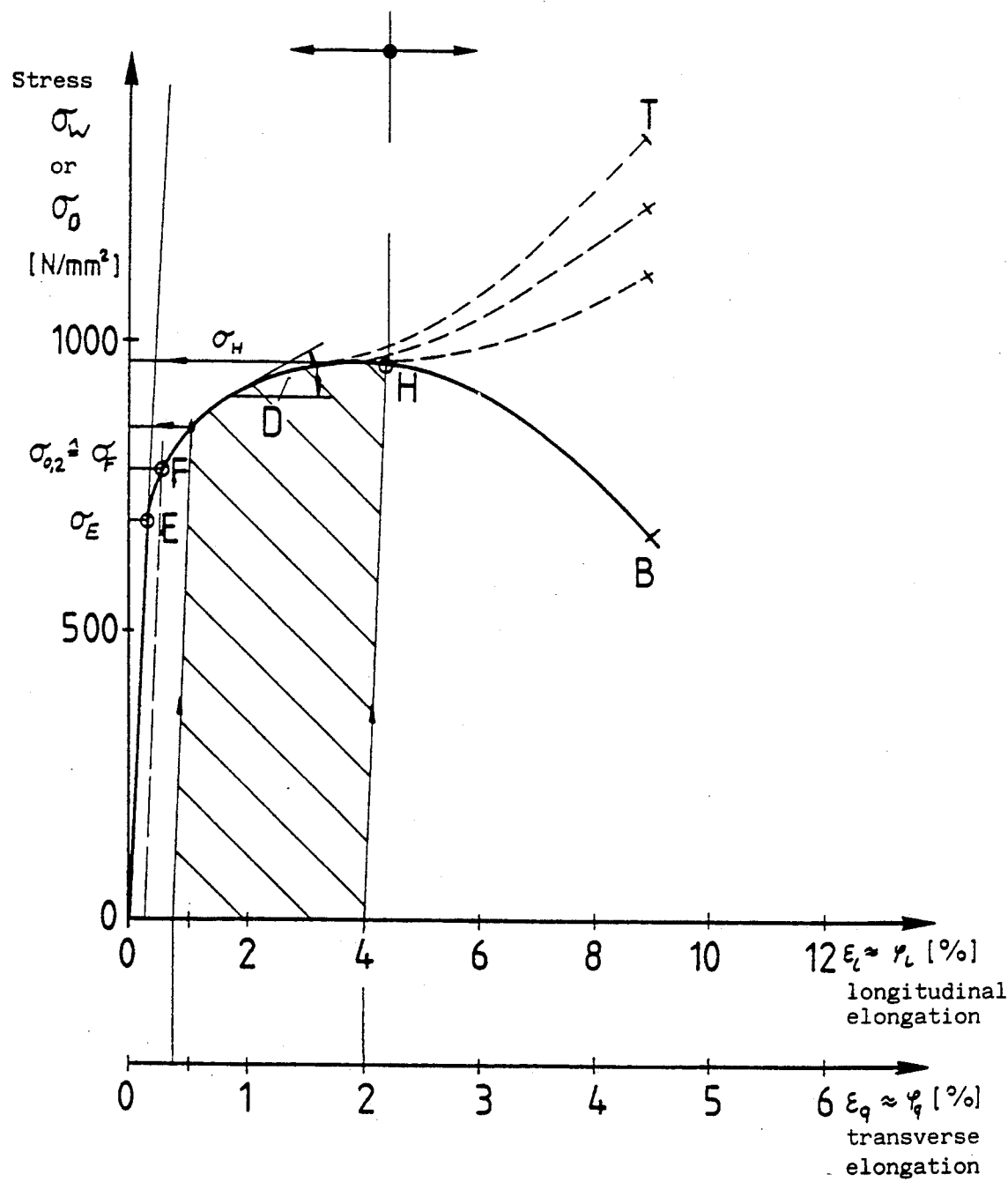
FIG. 1 is the stress/strain graph in the longitudinal and transverse directions for the material of the bolt.

The reduction of the cross-section of the bolt by drawing the bolt up to the plastic deformation region is based on the static stress/strain curve $\sigma_O(\epsilon)$ or $\sigma_W(\rho)$ of the bolt material as shown in FIG. 1. The curve can be subdivided into the following zones:

O-E: elastic range (Hooke's law range)

E-F: range between the elastic limit $\sigma_E$ and technical creep limit $\sigma_F$ (corresponds to $\sigma_{0.2}$)

F-H: range of elongation up to the point of maximum load H prior to necking and instability, and giving rise to a relatively high plastic elongation and transverse contraction.

The technical interest for the use according to the invention is primarily directed to the hatched zone in FIG. 1 preceding maximum load point H beyond which further elongation only induces a small change in tensile stress.

H-B: Beyond the point of maximum load H, local necking occurs (or in the cross-section and thus a tri-axial stress state H-T): takes place after a certain degree of solidification. Moreover, the stress $\sigma_W = F/A_W$ related to the instantaneous real cross-sectional area diverges to a larger extent from the strength $\sigma_O = F/A_O$ related to the initial cross-sectional area $A_O$, the degree of pluriaxiality and thus the natural or artificially induced notching effect being decisive in determining the percentage of the rupture strength $\sigma_T$ of the material which can theoretically be obtained. This stress state allows for example at locally restricted points of force transfer to obtain a stress level which technically can be used in the range of $\sigma_T/\sigma_{0.2} \approx 1.45 \ldots 1.80$ times the yield limit of the classically used bolt material. On the other hand, creep phenomena can be induced in the zones which are primarily subjected to uniaxial stress at a level $\sigma_Z$ of $\sigma_Z/\sigma_{0.2} \approx 1.10 \ldots 1.25$, which creep phenomena are sufficient for the required transverse contraction of the bolt.

The invention is based on the idea that by creating well-defined creep states and states of pluriaxiality in the bolt material, especially by using the kinematic solidification of the elongation as well as the increased resistance to transversal traction in pluriaxial, especially tri-axial stress/elongation states, a locally progressing creep zone can be produced in the unnotched bolt area at increasing longitudinal stress which, due to the principle of constant volume in plastic deformation according to the relation $\Delta d/d_O \approx 0.5 \Delta l/l_O$ with $\Delta d/d_O$ being the transversal elongation and $\Delta l/l_O$ being the longitudinal elongation, causes a completely uniform diameter reduction of the bolt and a suppression of the axial friction forces of the shrink-fitting. Moreover, the plastic transversal contraction becomes stabilized due to the kinematic solidification of elongation $$d\sigma/d\epsilon_{pl} > D(D > D_{min} > 0)$$

and a rupture due to instability is avoided on a level which is still located in the region of the uniform elongation, i.e. between the points E and H of the stress/strain curve.

For conventional bolt materials, the parameter of elongation solidification D and the natural elongation at highest load $\rho_H = \ln(1_H/1_O)$ are situated in a region in which a plastic cross-section reduction of the bolt $(\Delta d/d_O)pl$ of 1% to 2% is permitted, which is basically sufficient for loosening and axially removing even very tightly-fitted blade finger bolts, but also other shrink fittings of considerable length.

Moreover, the plastic contraction is still superposed by the elastic transversal contraction as follows $$(\Delta d/d_O)_{el} = v \cdot \sigma_F/E \text{ with } v \approx 0.3$$

if the bolt is loaded with a longitudinal traction at the creep limit $\sigma_F$.

Figure 2:
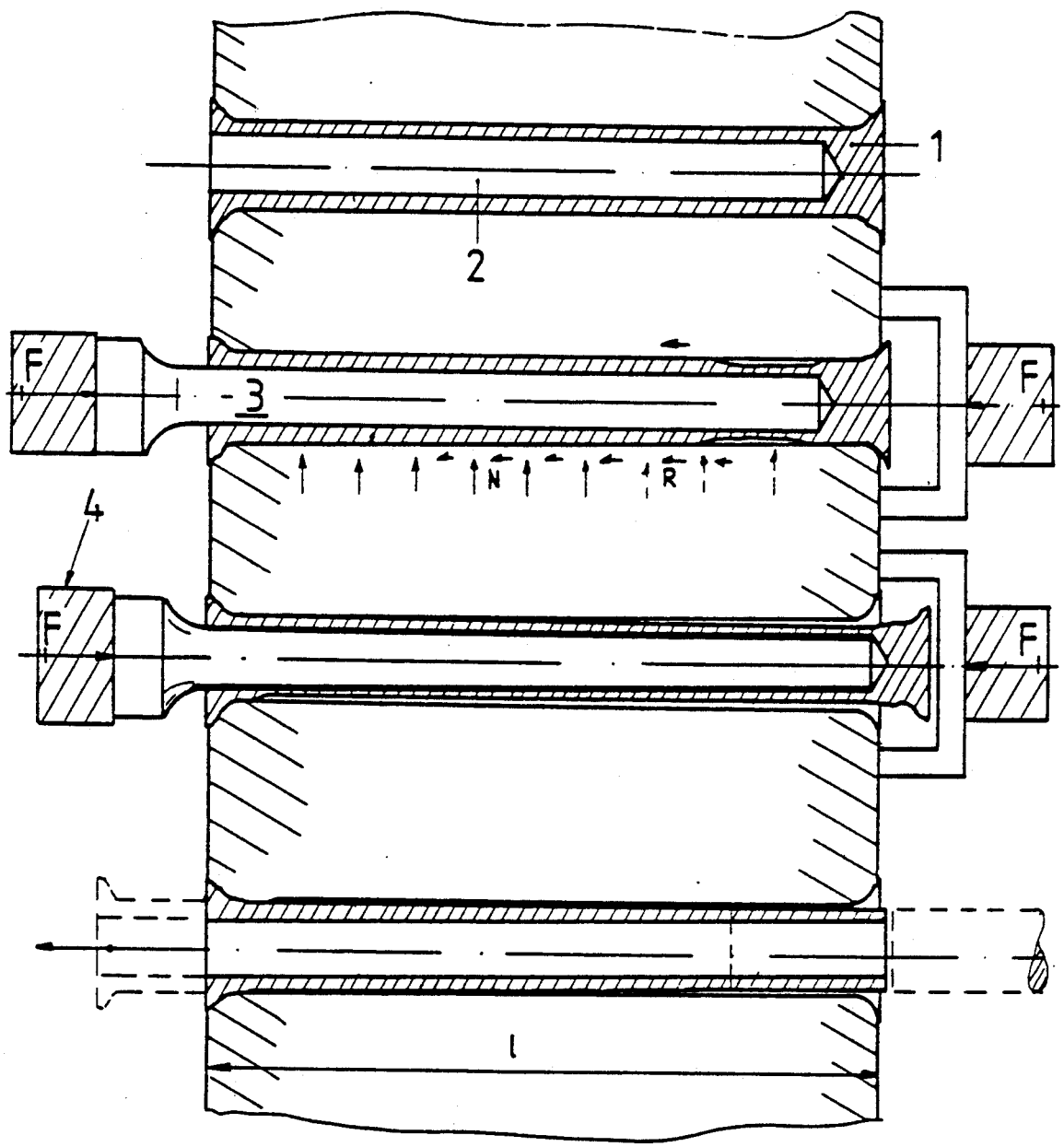
FIG. 2 represents the method steps of a first example of the method.

In the case of the method example shown in FIG. 2, the blade bolts 1 shrink-fitted into bores of the stems of steam turbine wheel disk heads and of the stems (forks) of the blade fingers will be referred hereafter as "bolts" for short and are provided over nearly their entire bolt length by means of a movable drilling machine of known type applied to the bolt end situated at the steam outlet side with a central bore thereby leaving only a residual wall thickness of 0.1d to 0.15d with d being the bolt diameter and the smaller value being applied to bolts of smaller diameters. This thickness does not present any drilling problem. A very hard and solid pressure pin 3 is inserted into this axial bore 2 and the pin end projecting from the axial bore is then pressure-loaded by the rivet press 4 which is normally used to rivet the bolts. This elongates the bolts plastically and, due to the law of constant volume, causes the bolt to reduce its diameter. Due to the solidification of the elongation in the bolt material, a progressing creep wave is produced along the length of the bolt which causes such a reduction of the axial friction forces that at the end, the bolt can be pushed out of the hole by applying a relatively low force only, the rivet head on the side of the steam entry having previously been cut off.

Figure 3:
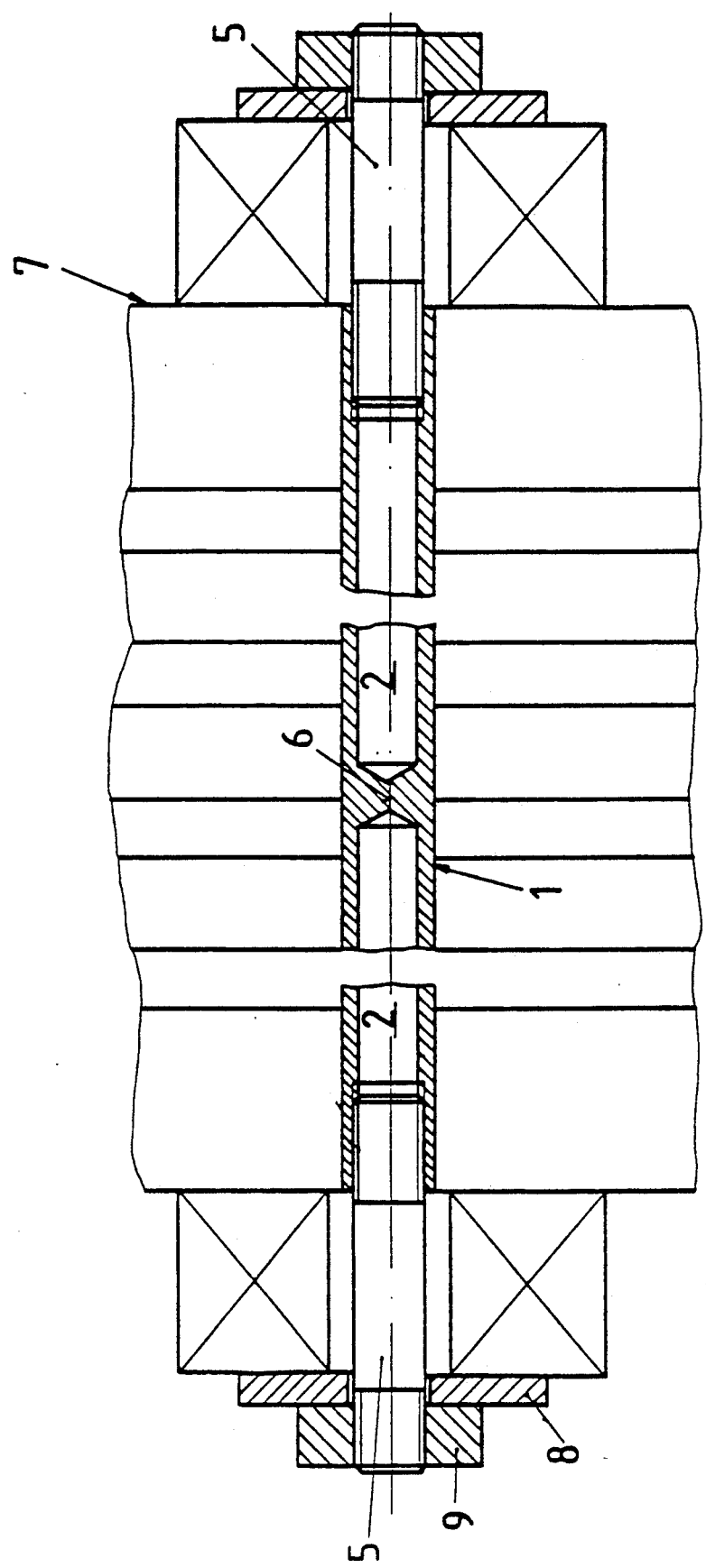
FIG. 3 is a fragmentary cross-section of a second example using an extraction device.

In the example shown in FIG. 3, the plastic transversal contraction is caused by applying a traction force to traction pins 5 engaged by screwing. At first, a hole as central as possible is drilled from both sides into the bolt, leaving only a residual wall thickness of 0.1d to 0.15d, thereby leaving a central partition 6 of a given length between the holes. The central partition may also be eliminated, which signifies that a through-passage is drilled from both sides. In at least one of the bores, and preferably in both bores 2, a fine screw thread is cut into the area close to the outer end, the core diameter of this thread being equal to the diameter of the bore in the bolt. According to the preferred embodiment, two traction pins 5 which in general should be made of a harder material than the bolt are screwed into the bore. The traction force of the traction pins 5 is applied by means of two hydraulic jacks simultaneously from both sides, the hydraulic jacks being applied on their inner side against the lateral surfaces of the wheel disk head 7 perpendicular to the bolt axis and at the outer end against the inner lateral surfaces of the intermediate plates 8 surrounding the traction pins with clearance, the intermediate plates 8 being applied by their outer lateral surfaces to the inner lateral surfaces of nuts 9 screwed on the traction pins, these nuts having a smaller size in radial direction than the intermediate plates 8.

The hydraulic jack acting on the traction pin 5' on the side of steam entry can be omitted and be replaced by a disk of the same length, a plate or similar element for compensating for the distance.

By means of the hydraulic jacks, a primarily uniaxial stress level $\sigma_Z$ is induced in the bolt cross-section between the bores $$\sigma_{0.2B} \leqq \sigma_H \approx 950 \text{ N/mm}^2 \quad (1.1)$$

Simultaneously, it must be ensured that in the notched residual section $d_B$–$d_a$ $_{thread}$ of the bolt which presents the threaded zone, the notch traction strength $\sigma_{BK}=\sigma_{BK}(\alpha_k)$ which can be achieved at a tri-axial stress state does not exceed the value of about 1100 N/mm². Similarly, the same considerations are applicable to both screwed-in traction pins 5 with $\sigma_Z \leqq \sigma_{0.2}$ for the unnotched areas of the pin.

For typical bolt diameters, the following screw thread types and traction forces are realistic:
diameter 18 mm: $M$ 14×1 ($d_K$=13), $F_Z$=10.9 ... 11.2 t
diameter 15 mm: $M$ 12×1 ($d_K$=11), $F_Z$=7.3 ... 7.5 t
diameter 13 mm: $M$ 10×0.75 ($d_K$=9.2), $F_Z$=5.9 ... 6.1 t The residual wall thickness of 2.5 mm in the case of a 18 mm bolt and a unilateral bore of a depth between 100 and 120 mm does not present any major problem in consideration of usual drilling precision and of deviations.

Besides the size of the traction pins 5, which is especially adapted to the pluriaxial stress states and besides the shape of the screw thread at the force transfer points, the following details are essential in view of the optimum removal of the bolt:

(a) The axial bores 2 are provided in their entry area between the beginning of the bore and the end of the bolt with a smooth (unnotched) cylindrical zone 10, the diameter of which equals the outside diameter of the thread, the length of which is defined by the empirical formula $L \approx \sqrt{R \times S_R}$ with R being the wall thickness of the cylinder and R the average radius of the cylinder, and/or screw threads having a low radial expansion such as sawtooth threads with precisely defined edge angles are used, these measures reducing the danger of a radial expansion and a turning out.

(b) The axial bore must be made as coaxially as possible to the longitudinal axis of the bolt and the screw thread must be made perpendicularly to the lateral surface of the wheel disk head 7 in order to avoid an additional bending and expansion.

(c) The speed at which the traction devices, for example hydraulic jacks, are loaded and which may be quite high in the elastic material range, must become very low after the creeping of the bolt 1 has begun, about 30 sec of mounting time to the point of highest load which is about 95 to 97% of the strength Yield in the notch section of the threaded bolt, in order to allow the material of the bolt to become plastified.

(d) Just prior to the point of highest load H and after having allowed the bolt 1 to be subjected to a sufficient plastical contraction, the pressure of the hydraulic jack on the less accessible side is slowly lowered, while the pressure on the side of good accessibility is maintained.

The bolt 1 may now be withdrawn, and this may be supported by slight hammer impacts on the end of the bolt on the less accessible side.

(e) in view of a possible rupture of the threads, the pin or the bolt, a safety sleeve or cap must be secured above the hydraulic jacks and the traction pins 5. The anchoring of the safety sleeves can be ensured in the threads of the adjacent bolts in case of bolt connections having several rows.

Figure 4:
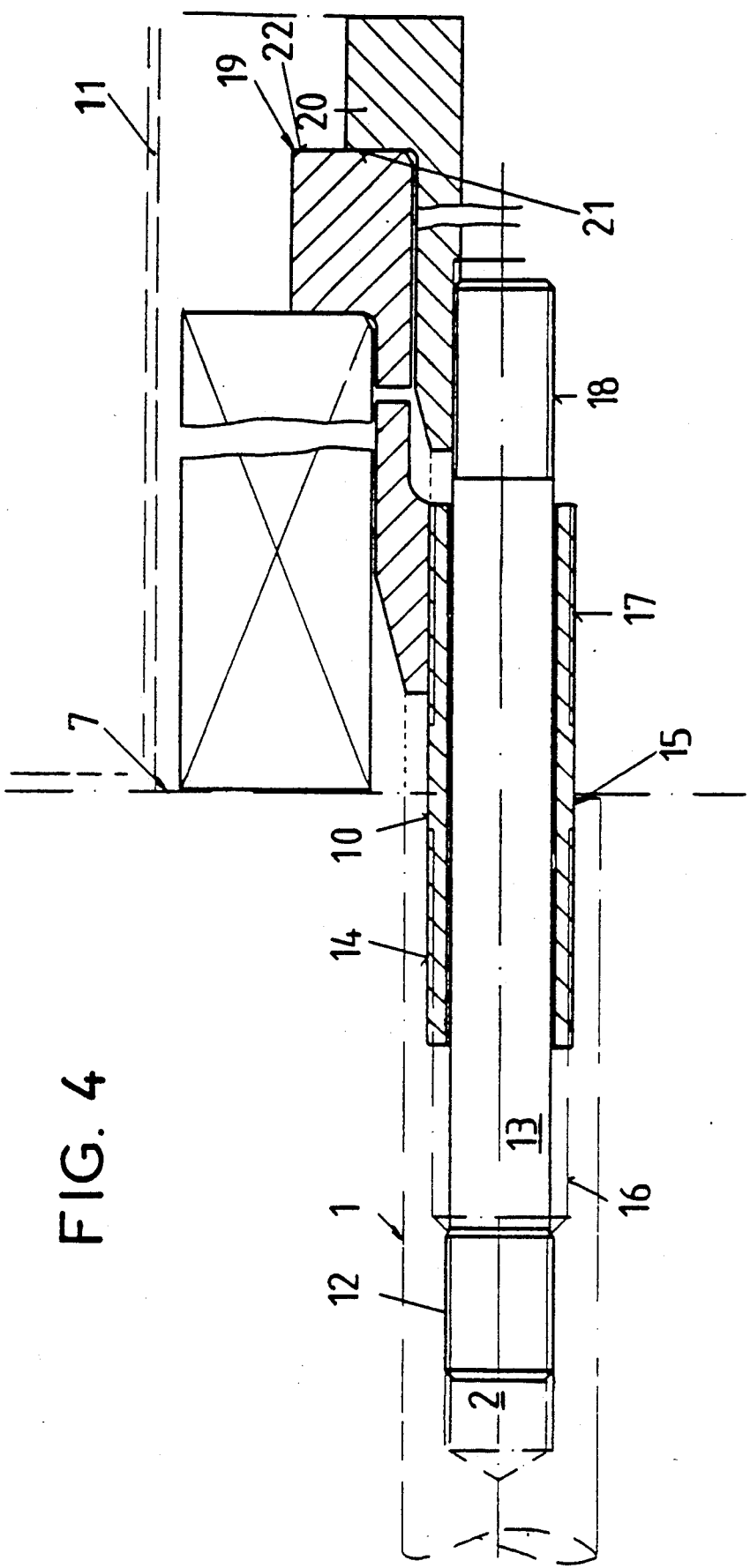
FIG. 4 shows a third example, partially in cross-section, and using a different extraction device.

In the case of FIG. 4, the bolt 1 is provided at both of its ends with a relatively short stepped axial bore 2, for example 60 mm long. Each axial bore presents a rear blind hole portion on which a fine screw thread 12 is made constituting a connection with the fine screw thread at the respective end of a conveniently sized traction bolt 13 which preferably is only slightly stepped. This blind hole portion is followed by a cylindrical portion of larger diameter which presents at its inlet area a smooth cylindrical portion of a length $L \approx \sqrt{R \times S_R}$, this portion being followed towards the inside by a fine screw thread 14 cooperating with the fine screw thread of a traction sleeve 15 having a thread core diameter equal to the diameter of the portion 10. Between the inner traction sleeve 15 and the beginning of the blind hole portion, a smooth cylindrical collar 16 of a diameter equal to the core diameter of the sleeve thread is provided which serves to restrict the stress of the traction sleeve 15.

The traction sleeve 15, which presents a constant outer diameter, projects from the axial bore 2 and is provided at its projecting end with a fine screw thread 17. The traction bolt 13 passes through the traction sleeve 15, projects laterally from the traction sleeve 15 and is provided at its projecting end with a fine screw thread 18. The core diameter at the two ends of the traction sleeve 15 and the traction bolt 13 are respectively the same. The front side thread of the traction bolt 13 constitutes a screw connection together with the inner thread of an outer nut 19 (as seen in radial direction) which acts as an elongation nut, i.e. a nut in which the tensile strength is the same in the entire volume. Correspondingly, the front side thread of the traction sleeve 15 constitutes a screw connection together with the inner nut 20 acting as elongation nut.

The elongation sections of the nuts 19 and 20 are sized according to the distribution of the traction force on the traction bolts 13 and the traction sleeve 15. The inner surface 21 of the inner nut head perpendicular to the longitudinal axis of the bolt 1 acts as abutment surface for the outer surface of the outer nut head which is also perpendicular to the longitudinal axis of the bolt 1. The pressure actuated member of a hydraulic jack which is applied on the inner side against the lateral surface of the wheel disk head 7 directed perpendicularly to the bolt longitudinal axis is applied against the inner surface 21 of the outer nut head.

The hydraulic jack, the nuts 19 and 20, and the projecting ends of the traction bolt 13 and of the traction sleeve 15 are surrounded by a safety cap 11.

The material of the traction bolts 13 and the traction sleeves 15 should be as hard as possible.

For the sizing of the threads, of the traction bolt diameters, the traction sleeve diameters and of the traction forces to be transferred, the indications made with reference to FIG. 3 apply correspondingly.

Compared with the embodiment shown in FIG. 3, the improvement described above allows almost the double traction force (longitudinal force) to be transferred, which is sufficient also to obtain a transverse contraction of the solid bolt section, if the yield point of the bolt material is between 650 and 700 N/mm².

The embodiment of FIG. 5 distinguishes over the embodiment according to FIG. 3 by the fact that the axial bore or the axial bores if both bolt ends are provided with a bore as is shown in the embodiment of FIG. 4, is or are respectively relatively short, and that the at least one traction pin 5' is conically shaped in the screwing area and presents a sawtooth thread of low elongation.

However, it is also possible to include small steps in the small inner bore 24 in FIG. 5, for example 5 mm diameter at the side of easy accessibility and 5.5 mm diameter at the other side and thus provide for a single well-defined breaking point of the bolts. After rupture at that point, the short threaded end which has not been plastically reduced in diameter, may easily be withdrawn between the wheel disks while the long bolt, which has been plastically reduced in diameter, can be extracted without ridges towards the accessible side without considerable effort.

Each axial bore 2 comprises a cylindrical smooth entry portion 10 of a length $L \approx \sqrt{R \times S_R}$, a conical intermediate portion 23 having a thread with a low radial expansion and a smooth cylindrical end portion 24. The thread in the intermediate portion and the thread of the respective cone of the threaded pin constitute a screw connection through which traction forces can be transferred into the bolt 1. The threads are preferably sawtooth threads 23a with bearing edge angles $\alpha$ between 0° and 15° C. (see FIG. 6).

The angle of inclination of the cone depends on the facility of manufacturing of the thread in the bolt bore by means of a thread cutter.

It is recommended to respect the following relations:

$d_B/d_{sa} = 1.125$ and $d_B/d_{si} = 3.6$.

As far as the threaded cone is concerned, it is further useful to select the thread pitch between 0.75 and 1 mm, the angle of inclination at about 5.7° (tan $\phi \approx 0.1$) and the bearing edge angle at 15°.

Each traction pin 5' consists of a conical thread portion, a cylindrical intermediate portion and a cylindrical end portion provided with a metric thread. This metric screw thread of the traction pin constitutes a screw connection with the inner thread of a nut, elongation screw or similar, the inner surface of the nut, the elongation screw head or similar directed perpendicularly to the longitudinal bolt axis, acting directly or indirectly as abutting surface for the actuator member of the hydraulic jack. A centering sleeve can be provided for centering the hydraulic jack, this sleeve extending beyond the intermediate portion of the pin and abutting against the side surface of the wheel disk head 7.

Figure 7:
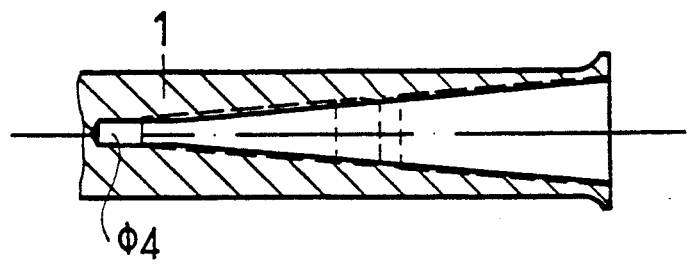
FIG. 7 is a cross-section through a part of a modified short core axial bore with a conical thread having two portions.

If a very high force transfer is desired and/or if it is impossible to manufacture the conical thread over the entire relatively long bearing length or if this poses problems, a conus tip may be used having two thread portions whereby the inclination angle, the thread pitch and the bearing edge angle of both sections must not be the same (FIG. 7).

By making maximum use of the possibilities given by the pluriaxial tensile stress and elongation states, tensile strengths of nearly 920 N/mm² can be achieved in the solid bolt cross-section O—O. In this case, the yield point of the traction pin 5' in the cross-section 4—4 must not be higher than about 1200 N/mm², a value which can be achieved securely for very hard materials and which can be supported as often as necessary.

The method of removing the bolt is in general performed according to the embodiment shown in FIG. 3. It should however be avoided to apply traction only from one side and to contract the bolt from the steam outlet side because this necessarily entails deep ridges in the bores of the wheel disks and the blades.

The bolt 1 should be plastically elongated over its entire length and, as a consequence, should be reduced in cross-section before being extracted. This can be achieved by applying traction on both sides by means of hydraulic jacks or similar means. But it is also sufficient to only hold a member according to FIG. 5 against the side of reduced accessibility and to apply a traction force by the hydraulic jack at the side of good accessibility. When the highest load has been obtained, the member on the hardly accessible side is withdrawn in order to allow the extraction of the bolt 1.

Figure 8:
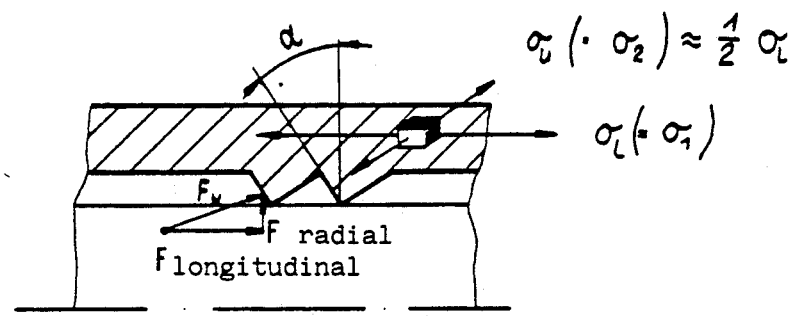
FIG. 8 shows the distribution of forces and stresses around the edges of the thread.

According to claim 6, another characteristic of the invention is that the thread edges have, in accordance with FIG. 8, an angle $\alpha$ which is selected in such a way that a pluriaxial stress state with $\sigma_u(=\sigma_2) \approx 0.5\sigma_L(=\sigma_1)$ is established in the cylindrical cross-section of the core due to the cooperation of the elongations in longitudinal and in circumferential direction, the beginning of the creep in the cylindrical residual cross-section of the core being thereby increased by about 15% and simultaneously a jamming of the core in the outer member being avoided due to radial expansion. In FIG. 8, the forces applied to the thread edges and the resulting tensile stresses are indicated. The circumferential stress $\sigma_u$ and the longitudinal stress $\sigma_L$ can be adjusted by the convenient choice of $\alpha$ in such a way that these two main stresses behave like $\sigma_u = 0.5\sigma_L$. From these stresses, $\sigma_u = 0.5\sigma_L$ and $\sigma_L$ a circumferential elongation $\epsilon_u$ is obtained according to the relation:

$\epsilon_u = (\sigma_u - \mu_{PL}\sigma_L)/E$ with $\sigma_u = 0.5\sigma_L$ resulting therefrom:
$\sigma_u = (0.5\sigma_u - \mu_{PL}\sigma_L)/E \approx O$ as $\mu_{PL} \approx 0.5$ Thus, there is no circumferential elongation and no radial expansion which signifies that the bolt cannot jam.

Figure 9:
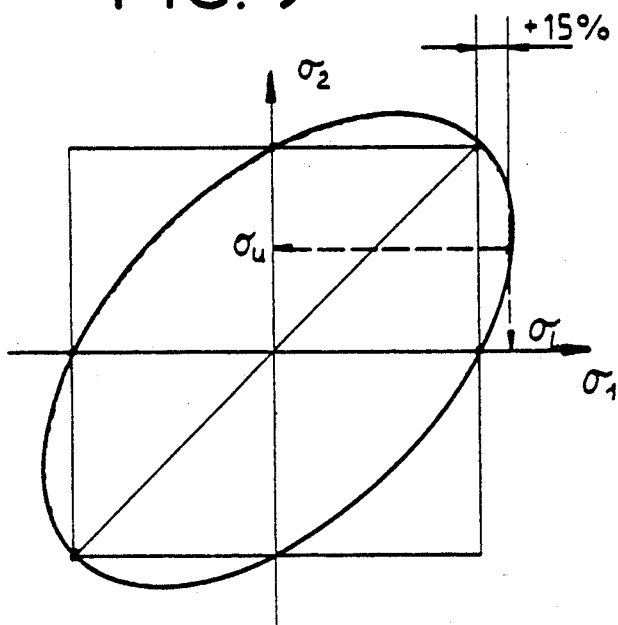
FIG. 9 shows the delayed beginning of creep in the residual section due to a defined two-axial tensile strength state.

According to FIG. 9, it results from the hypothesis relating to the energy of deformation that in the case of a biaxial stress state, the beginning of the creeping is located on an ellipse if the main stresses $\sigma_1$, $\sigma_2$ are chosen as ordinates. It is seen that the creep stress for $\sigma_u = 0.5\sigma_L$ increases by about 15% with respect to an uniaxial stress state in the point $\sigma_2(0), = 0$, which signifies optimum use of the material.

I claim:

1. A method of removing an elongate shrink-fitted metal core such as a bolt from a hole extending through an object, comprising:
cutting an axial bore in said metal core as coaxially as possible;

subjecting the core to a force up to the plastic deformation range of said core, thereby plastically deforming said core;

loading said core, after the plastic deformation has begun, at a relatively low speed up to a maximum stress of between 95% and 97% of its rupture strength such that said core shrinks radially; and axially removing the core from the hole.

2. The method according to claim 1, wherein said loading step comprises applying a first force to said core from one end of said hole, and simultaneously applying a second force, opposite to said first force, to a side of said object which is opposite to said one end of said hole.

3. The method according to claim 1, wherein said loading step comprises simultaneously applying opposite forces to opposite ends of said core, each of said forces being applied in a direction away from said object.

4. The method as in claim 1, wherein said step of subjecting said core to a force up to the plastic deformation range of said core comprises inserting a solid bolt having an axially extending end into said axial bore, and loading said end of said bolt by a pressure device, and wherein the step of removing the core axially from the hole comprises extracting the core.

5. The method as claimed in claim 4, wherein said steps of subjecting said bolt to a force up to the plastic deformation range of said core and loading said core, after deformation has begun, result in a terminal expanded area of said core, and said method further comprises the step of cutting off said terminal expanded area.

6. The method as claimed in claim 1, wherein the step of subjecting the core to a force up to the plastic deformation range of said core comprises projecting a coupling member laterally from an axial bore in the core and connecting said coupling member to a traction device, and applying a traction force to said core via said traction device, and wherein said step of axially removing said core from said hole comprises extracting the core from said hole.

7. The method of claim 6, wherein said steps of applying a traction force to said core and loading said core, result in a terminal expanded area of said core, and said method further comprises the step of cutting off said terminal expanded area.

* * * * *